United States Patent [19]

Schwyter

[11] Patent Number: 5,027,722

[45] Date of Patent: Jul. 2, 1991

[54] PROCESS AND DEVICE FOR PROCESSING SLAG AND OTHER COMBUSTION RESIDUES FROM WASTE INCINERATION PLANTS

[75] Inventor: Leo Schwyter, Sirnach, Switzerland

[73] Assignee: Leo Schwyter AG, Rikon im Tosstal, Switzerland

[21] Appl. No.: 499,372

[22] PCT Filed: Sep. 25, 1989

[86] PCT No.: PCT/CH89/00174

§ 371 Date: Aug. 10, 1990

§ 102(e) Date: Aug. 10, 1990

[87] PCT Pub. No.: WO90/03856

PCT Pub. Date: Apr. 19, 1990

[30] Foreign Application Priority Data

Oct. 13, 1988 [CH] Switzerland ............... 3827/88

[51] Int. Cl.$^5$ ............... F23G 5/00; F23G 5/12
[52] U.S. Cl. ............... 110/259; 110/165 R; 110/165 A; 110/344
[58] Field of Search ............... 110/346, 259, 165 R, 110/165 A, 255, 344

[56] References Cited

U.S. PATENT DOCUMENTS

| | | | |
|---|---|---|---|
| 4,669,397 | 6/1987 | Galgana et al. | 110/259 |
| 4,878,440 | 11/1989 | Tratz et al. | 110/259 X |
| 4,915,039 | 4/1990 | Ringel | 110/165 A X |
| 4,922,841 | 5/1990 | Kent | 110/346 |

FOREIGN PATENT DOCUMENTS 3700608 1/1987 Fed. Rep. of Germany.

OTHER PUBLICATIONS

Swiss Publication, "Swiss Engineer and Architect", No. 19, 1983.

Primary Examiner—Edward G. Favors
Attorney, Agent, or Firm—Tarolli, Sundheim & Covell

[57] ABSTRACT

The slag occurring in the waste burning plant (1) is conducted from the slag exit (6) of the oven, directly into a separator (7) for coarse material and iron. There is no chilling in water. After the coarse cleaning, the slag is heated again by means of hot flue gases from the waste burning oven (1) in a preheating device (8), and then, with the feeding of additional heat, melted in a melting oven (10). Flyash is mixed with the stream of slag before the preheating device (8). The harmful substances vaporizing in the preheating and melting are condensed out of the exhaust gases and recovered. Parallel with the preheating device (8) is arranged a pyrolysis oven (9) which is also heated with a partial stream of hot flue gas from the exhaust channel (3). The pyrolysis gas is used as fuel for producing additional heat in the melting oven (10). All the remaining harmful substances not vaporized enter into harmless compounds in the molten slag or are bound, insoluble by water, in the resultant fused slag.

15 Claims, 2 Drawing Sheets

PROCESS AND DEVICE FOR PROCESSING SLAG AND OTHER COMBUSTION RESIDUES FROM WASTE INCINERATION PLANTS

TECHNICAL FIELD

The invention relates to a process for the treating of slag and other combustion residues from waste-burning plants in which, after leaving the combustion oven, the unburned coarse material and magnetic parts are separated from the slag, and the hot flue gas is carried off through a flue gas channel, and an apparatus for carrying out the process.

BACKGROUND ART

In waste-burning plants, as we know, combustion residues occur in the form of slag, flyash and filter dust, which are relatively strongly loaded with substances harmful to the environment. The slag occurring in rubbish and waste combustion ovens constitutes, by amount, the greatest part of the combustion residues. The slag has, on leaving the combustion plant, contents in harmful substances which prevent its further use, for example, as building material, and even the storage of the slag in dumps can be an environmental hazard. The content in harmful substances depends on the composition of the rubbish or waste delivered for burning and also on the quality of the combustion process. On an average, the content in harmful substances of slags from household waste burning plants should be in the range from 50 to 100 grams per kilogram slag. The harmful substances contained in the slag are, in particular, chlorides, lead, cadmium, zinc, iron, copper, organic substances and other impurities. Corresponding analyses have been published, for example, in the publication Swiss Engineer and Architect, No. 19, 1983. In the storage of slags from waste-burning plants in dumps, the leaching water must be collected and decontaminated, since this is otherwise a considerable danger to the environment. Corresponding problems occur also with the use of slag in road building. Therefore, in these cases, the slag is very often mixed with cement and made impermeable by water, or stabilized. However, the organic substances, especially carbon compounds, decompose the slag in a long-term process, so that harmful substances can emerge even with stabilized slags. Since dumps for slag are becoming less available all the time, the storage of slag presents a great problem. The use in road building is also greatly limited by the high content in harmful substances, and the danger of decomposition in the isolated fields of use.

German Publication No. 3,700,608 describes a process and an apparatus for treatment of slag in which, after chilling the slag in the known wet slagger or water bath, fines with a grain size up to 1 mm are removed from the slag. The remaining slag has a reduced content in harmful substances and can be used, under certain preconditions, for street and road building. This known process for cleaning the slag still cannot satisfy the increasing claims to the minimum content of harmful substances in the slag. The cleaned slag still contains residues of water-soluble harmful substances, and also of organic substances which decompose the slag. The chloride content, for example, may be up to 50% of the original amount. Another disadvantage is that the slag must be temporarily stored after chilling in the water bath, and thus considerable storage volumes are necessary. The dripping water occurring must also be contaminated since it is fouled. The harmful substances of the dust part are floated by the chilling bath into the slag, and adhere in the pores after drying. The proposed drying to a residual moisture of 1% requires, with great amounts of slag, a very high consumption of energy. The cleaned slag with this high degree of drying is not suitable as a building material and must be moistened again, for example, for road and street building.

SUMMARY OF THE INVENTION

The problem of this invention is to design a process by means of which the slag and other combustion residues occurring in waste-burning plants can be treated so that the part in soluble harmful components in the treated slag is so low that there is no danger to the environment, and no dust or fines occur from the treating process which components are very hard to decontaminate. Moreover, the process should use the energy occurring in the combustion oven, and the treated slag should be possible to use, without binder or additives, as building material. The requirement for outside energy should be reduced and the total degree of utilization of the plant increased. The apparatus for carrying out this process should be simple to construct, and possible to operate without the use of washing water. It should also make possible the recovery of heavy metals and other substances from the treating process.

This problem is solved in a process according to the upper term of claim 1, according to the invention, by the distinctive features of this patent claim. The solution, as to the apparatus, of this problem is defined by the distinguishing part of claim 8. Advantageous further developments of the invention are given from the features of the dependent claims.

In the process and apparatus according to the invention, the slag still hot is fed directly from the burning oven over a conveyor belt to a cleaning step. Unburned coarse material and magnetic parts are removed here from the slag, still hot, and the slag is then carried into a preheating device. Before this preheating device, if necessary, other combustion residues such as flyash are introduced from the flue channel and treated in common with the slag. This preheating device is heated by means of burned-out fumes from the flue channel of the waste-burning plant, and makes possible the use of a part of the exhaust heat produced by the burning process in the plant. This removal of heat from the chimney makes possible increasing the amount of burned waste put through the waste burning plant, since by this removal of heat, load on the waste heat boiler and the flue draft is reduced. This measure leads to considerable improvement in existing plants, since by increasing the heat value of the waste, these plants could usually no longer be loaded with the original throughput amount. But rather, the throughput had to be reduced to the maximum allowable heat load of the flue draft and the boiler. Since a large volume flow of hot flue gas is available, even large amounts of combustion residues, such as those which form slag, can be heated. With this, a heating of the slag by means of the hot flue gas to a few hundred degrees Celsius is possible. The upper limit should be about 600° C. The preheated slag is now put into a melting oven which is heated with additional energy. By means of the additional energy, the slag is now heated further until it is above its melting point which normally lies higher than 600° C. The organic substances still present in the slag can be burned up at this temperature or enter into other components which go into the slag. On heating to over 600° C., the harmful substances contained in the slag enter into stable and harmless compounds with other substances of the slag. The cleaned and treated liquid slag is cooled after the melting oven, by which a glass-like solid mass results. According to the kind of cooling and withdrawal from the melting oven, pieces of the desired size may be formed. These glass-like pieces may be used, without further treatment or additives, as building material, and the substances which can still be washed out lie far below the allowable limits of today's environmental regulations. Since organic substances are no longer contained which could decompose or be decomposed, the treated slag is stable.

Parallel with the preheating apparatus is arranged a pyrolysis oven which is designed as a gas producer based on pyrolysis. At a suitable point in the flue gas channel, chimney or waste gas boiler, as the case may be, of the waste burning plant, a second hot partial stream is received. This is a completely burned flue gas at a suitable temperature for a process which follows. The branched flue gas stream serves for the heating of the pyrolysis oven and the waste substances placed therein. Since the branched flue gas has a temperature of up to 650° C., this is sufficient for the pyrolytic treatment of the waste substances. Otherwise, by partial burning of the waste in the pyrolysis oven, the temperature can be additionally raised. The operation of such pyrolysis units is known per se. The pyrolytic gas is conducted into the melting oven and is the fuel for producing the additional energy for melting the slag. On the melting oven is arranged a burner by means of which is produced the energy needed for the melting process by combustion of the pyrolysis gases produced in the pyrolysis oven. For the whole process of heating and melting of the slag or other combustion residues, normally, no additional energy from outside is needed since all the energy is taken from the circulation of the waste-burning plant and an additional circulation of waste. The additional waste circulation consists, here, of the pyrolysis unit. In this unit, old wood, clarification slime, old tires and the like can be advantageously transformed into combustible pyrolysis gas. These waste substances occur today in waste combustion plants as excess material, since they can no longer be burned in the overloaded plants.

The exhaust gases occurring in the preheating apparatus in the pyrolysis oven and in the melting oven are conducted through a condenser in which the exhaust gas is cooled to a temperature at which at least a part of the heavy metals and their compounds condense. This condensate is collected and then regenerated and fed to further processing. The waste gas coming from the condenser, which contains only a part of the original harmful substances, is fed back into the entrance line of the flue gas cleaner and cleaned in the already existing flue gas cleaner of the combustion unit. Only then is it released from the process and through a chimney to the environment. In the cleaning process of the slag, no harmful substances occur which would have to be specially treated and decontaminated. The condensate occurring in the condenser may be considered as raw material for further processing steps. The vitreous slag occurring at the end of the process may be stored for as long as desired and without special measures, since it has no water-soluble components and is stable.

The use of the process and apparatus according to the invention allows an increase of throughput capacity of the waste-burning plant connected before it, since waste heat from the flue gas channel is used for the operation of the preheating device and the pyrolysis oven. As mentioned, because of the increase of fuel value of the waste delivered to the waste-burning plant, especially in existing plants, the waste heat boiler and chimneys arranged after the combustion chamber are overloaded. As a result, the throughput of waste through the combustion process must be reduced, and thus the desired amounts can no longer be processed in the plant. Through removing a part of the hot fumes from the chimney or waste heat boiler, the load of these parts of the waste burning plant is reduced, and the processing capacity of the whole plant can be correspondingly increased. The operation of the waste-burning plant is in no way impaired functionally by this. On the contrary, it is improved. The hardened fused slag can be used without further treatment as building material for road building, but is also suitable as filler material in other building elements. No dust-form fractions occur. Because of the insolubility in water, any cooling water used is not soiled and can be used in circulation. Thus, the process and apparatus make possible the treating of slag containing harmful substances and other combustion residues in waste-burning plants with utilization of energy streams present, and allow the production of a building material which in no way endangers the environment. In a further step, the harmful substances extracted from the melt are separated from the waste gas and are thus in a form which can also be fed recovery. The total energy balance and the capacity balances of the unit according to the invention are especially good as compared with known equipment.

BRIEF DESCRIPTION OF THE DRAWINGS

The foregoing and other features and advantages of the present invention will become apparent to one skilled in the art to which the present invention relates from reading the following description of preferred embodiments of the present invention in conjunction with the accompanying drawings, wherein.

DESCRIPTION OF PREFERRED EMBODIMENTS

Figure 1:
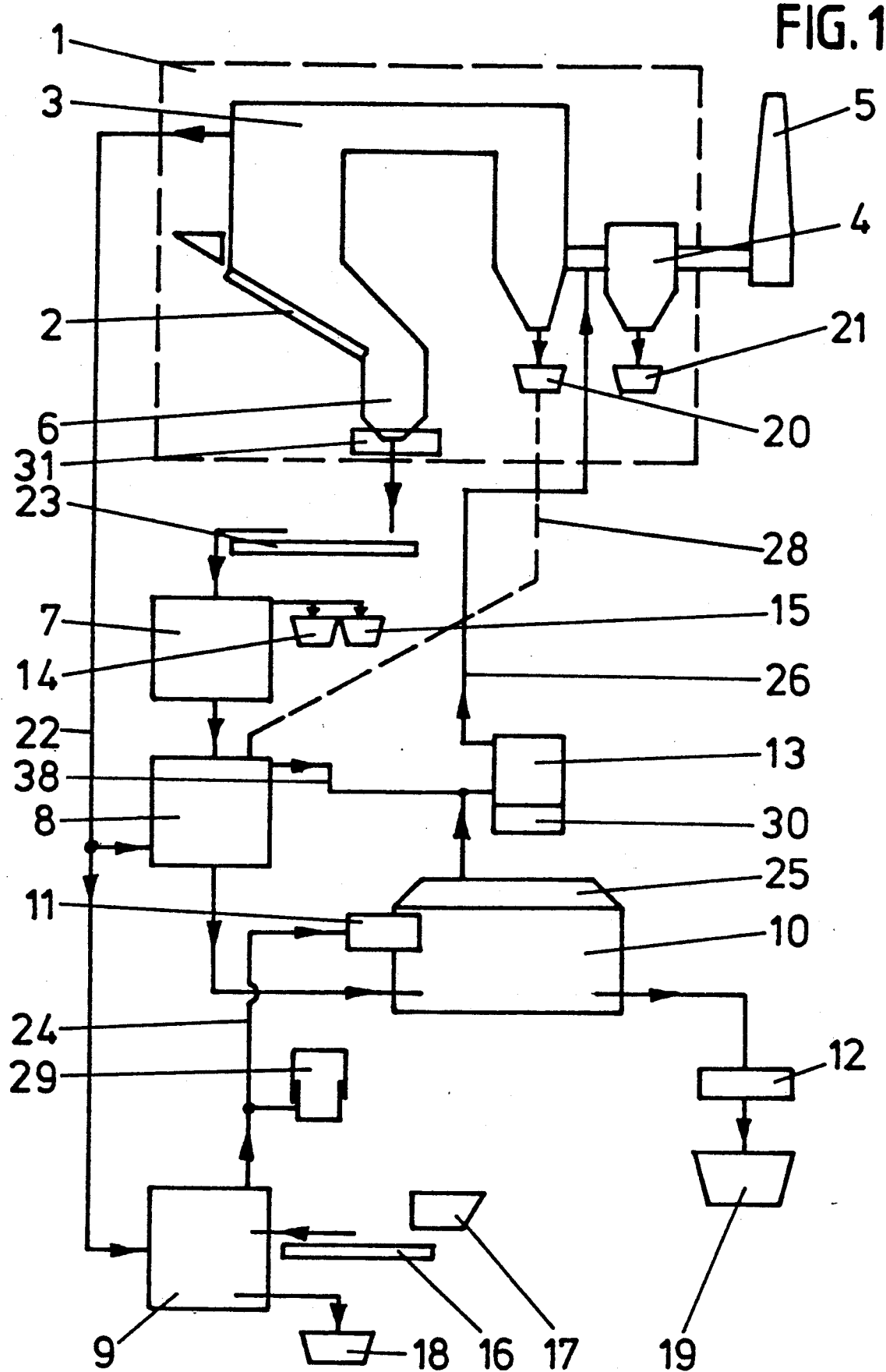
FIG. 1 shows, in diagram, an apparatus or plant for the treating of slag and flyash from a waste burning plant connected before it.

The waste burning plant 1, shown in diagram in FIG. 1, consists among other things of a burning grate 2, a flue gas channel or waste heat boiler 3 and a connected flue gas cleaner 4 with an air escape chimney 5. At the end of the burning grate 2 is arranged a slag exit 6 through which the slag, without chilling in a water bath or a wet slagging, is carried out of the waste burning plant 1. At the end of the slag outlet 6 is a blocking device 31 in the form of a cell sluice which seals the burning chamber from the surrounding air. The waste burning plant 1 has also a collection tank 20 for fly dust from the flue gas channel 3 and a collection tank 21 for the residues from the flue gas cleaner 4.

After the slag exit 6 and leaving the blocking device 31, the hot dry slag is carried over a conveyor device 23 into a coarse cleaner 7. The conveyor device 23 is suitably made heat resistant, since there are still glowing metal parts in the slag, or unburned waste parts may ignite again. The coarse cleaner 7 serves to remove from the stream of slag, unburned and other coarse parts as well as iron content.

Figure 2:
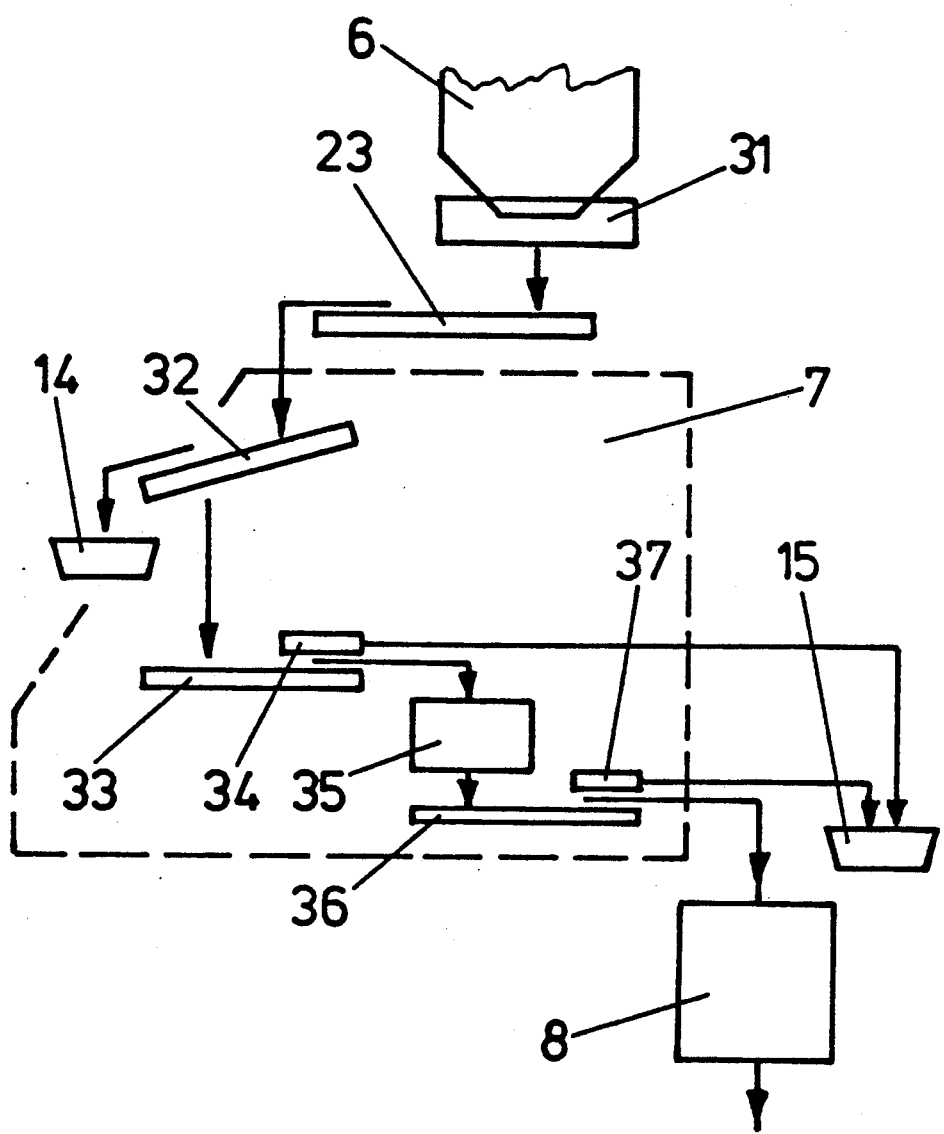
FIG. 2 shows, in diagram, the structure of coarse cleaning in the unit according to FIG. 1.

In FIG. 2 are shown the several elements of the coarse cleaner 7. From the conveyor device 23, the slag arrives on a separator 32. The slag is cleaned of larger unburned parts and of coarse material, while the separator 32 lets through only a certain maximum size. The coarse material separated falls into a coarse material tank 14 and, from here, is fed to further processing or to a respective dump. Unburned coarse material is normally fed back to the combustion oven 1. The slag, cleaned of coarse material in the separator 32, arrives at a conveyor device 33 which is provided with a magnetic separator 34. By means of this magnetic separator 34, all magnetic material, that is, the iron component is removed and temporarily stored in a collection tank 15 for re-use. In our experience, about 10 to 20% of the weight is removed, by the separator 32 and the magnetic separator 34, from the slag at the outlet. This partial amount can, for the most part, be used again. After the magnetic separator 34, the slag arrives by the conveyor device 33 in a breaker 35. This breaker, in the example shown, has the purpose of separating the slag into pieces with a maximum size of 100 mm, and thus making possible an additional after-treatment. This additional breaking of the slag proves suitable when the slag on another conveyor device 36 is carried past a second magnetic separator 37, and magnetic parts bound in great lumps of slag before the breaker can now be removed. The magnetic material occurring in the magnetic separator 37 is also fed into the collection tank 15 and temporarily stored there.

After the coarse cleaner 7 is arranged, as shown from FIG. 1, a preheating device 8 through which the precleaned stream of slag is conducted. This preheating device 8 is connected through a flue gas line 22 with the flue gas channel 3 of the waste burning plant 1. Completely burned-out hot as which has, in the plant represented, a temperature of about 650° C. is removed through this flue gas line 22 to the flue gas channel 3. This stream of flue gas is led through the preheating device 8, and the stream of slag is heated in this way. Under favorable throughput conditions, the slag may be heated to about 600° C. The unit shown is so designed that, optionally, the flyash collected in the container 20 may also be brought through a conveyor line 28 into the preheating device 8 and conducted through the next process.

Parallel with the preheating device 8 is arranged a pyrolysis oven 9 in which waste substances such as old wood, clarifying slime, old tires and the like may be used. In the example described, the pyrolysis oven 9 is connected through the flue gas line 22 with the flue gas channel 3, and heated with hot flue gas from the waste burning plant 1. If the temperature of the hot flue gases which are introduced through the flue gas line 22 into the pyrolysis oven 8 is not sufficient for the perfect gasification of the waste substances, the pyrolysis oven 9 is designed so that the waste substances brought into the oven are partly burned, and in this way additional heat can be produced. In the pyrolytic conversion of the waste substances like wood, old tires or clarification slime, a very slight amount of ash results which is collected in the ash container 18. This ash also, after first separating the solids and iron parts through the preheating device 8, can be introduced into the treating process. The wastes suitable for pyrolysis, old rubber in the example shown, are brought from waste bunkers 17 through the loading device 16 into the pyrolysis oven 9. Both the flue gases used for preheating in the preheating 8 and that used in the pyrolysis oven 9 are returned, at a lower temperature level, through the line 38 and another line, not shown, into the flue gas channel 3.

The pyrolysis gas produced in the pyrolysis oven 9 and the stream of slag heated in the preheating device 8, and other combustion residues, are brought into a melting oven 10. The pyrolysis gas flows through a carrying line 24 into a burner 11 on the melting oven 10 and is burned here. To assure the continuous flow of the process, a gas storage 29 is built into the carrying line 24. With the aid of the heat of combustion of the pyrolysis gas, the combustion residues brought into the melting oven 10 preheated to a temperature of about 600° C. are heated to a temperature of at least 800° C., preferably about 1400° C. and completely melted. Any organic substances present are completely burned up in the preheating device 8 and again in melting oven 10, or enter into compounds with other substances which are stable and insoluble in the long term. The other harmful substances contained in the combustion residues also enter into solid compounds with substances or vaporize, for the most part, in the melting oven 10. The resultant gases with the volatile harmful substance components are picked up in a waste gas collector 25 and returned through a waste gas line 26, at a suitable point, into the flue gas channel 3 of the waste plant 1. The waste gases from the preheating device 8 through the line 38 and the waste gases from the pyrolysis oven 9 are also fed into this waste gas line 26. This return of the waste gases takes place on the entrance side of the flue gas cleaner 4 by which it is assured that these waste gases are also cleansed of any harmful substances, and only then released through the chimney from the plant. There is also built into the waste gas line 26 a cooling device in the form of a condenser 13 by which, in particular, the heavy metal vapors are separated from the stream of waste gas. The harmful substances separated in the condenser 13 from the waste gases of the melting oven 10 are picked up on a condensate collector 30 fed to recovery. With suitable known construction of the condenser 13, single fractions can be separated which allow a recovery of these harmful substances for use. The melt of combustion residues produced in the melting oven 10 is largely purified of harmful substances in this way, or enter into compounds in the melt which are no longer water-soluble. At the outlet side of the melting oven 10, the melt is led into a cooling device 12 which, in the example shown, consists of a water chilling bath. In this chilling bath, the slag brought in fluid is burst and cooled, and with suitable treatment, occurs in the desired grain size which can be fed direct to further processing and further use, for example, in street and road building. From the cooling device 12, the glass-like hardened slag falls into a slag bunker 19 where it is stored without problems or can be carried to the place of use.

The plant represented here requires, besides the energy for the operation of the mechanical drive and any auxiliary or support heat sources, practically no additional energy from outside. All the energy needed is taken from the flue gas stream of the waste burning plant in the flue gas channel, or produced by the pyrolytic use of high-value waste substances in the pyrolysis oven 9. So long as sufficient high-value waste substances are present which could not be burned by the waste burning plant 1, the pyrolysis oven 9 is designed large enough so that more pyrolysis gas can be produced than is needed for the operation of the melting oven 10. This excess pyrolysis gas then serves as raw material for a thermal energy production, not shown, connected after. The combustion residues occurring mainly by amount, especially the slags, can be treated. The treated slag in the slag bunkers 19 can be used, without objection, as building material or used as filling material or stored in deposits.

This invention has been described above with reference to preferred embodiments. Modifications and changes may become apparent to one skilled in the art upon reading and understanding this specification. It is intended to cover all such modifications and changes within the scope of the appended claims.

I claim:

1. Process for the treating of slag or other combustion residues from waste burning in which after leaving the burning oven, unburned coarse material and magnetic parts are separated from the slag and the hot flue gas led out through the flue gas channel, with the distinction that the slag, directly after the burning oven and without previous chilling in a water bath, passes through a coarse cleaning, and coarse material and magnetic parts are separated from the slag; the dry, coarsely cleaned slag is again heated to at least 800° C., and then melted; the harmful substances contained in the slags are at least partly burned or vaporized, and the gaseous part is separated from the slag as an exhaust stream, and then the fluid slag is cooled and hardened to solids which can be stored.

2. Process according to claim 1, with the distinction that for the heating of the slag, a partial stream of hot gas from the flue gas channel of the combustion oven is taken and passed through the slag, and then there is fed, additionally, to the heated slag, a combustible substance or substances, and through the burning of this fuel, the slag is heated above the melting point.

3. Process according to claim 1, with the distinction that after the coarse cleaning, flyash from the flue gas channel is added to the slag, and both combustion residues are further treated in common.

4. Process according to one of claims 2, with the distinction that a second partial stream is taken from the hot flue gas stream of the combustion plant, and a pyrolysis oven is heated with this hot flue gas stream; in this pyrolysis oven, by the vaporizing of waste materials, a combustible pyrolysis gas is produced as fuel; the pyrolysis gas is combined with the slag and burned, and through the resultant heat the slag and/or combustion residues are melted.

5. Process according to claim 4, with the distinction that, by partial burning of the waste material in the pyrolysis oven, additional heat is produced.

6. Process according to one of claim 1, with the distinction that the waste gas stream separated from the slag is cooled, and the harmful substances are separated by a condensation process.

7. Process according to claim 1, with the distinction that the slag, after coarse cleaning, is broken into pieces with a maximum size of 100 mm, and conducted through a second magnetic separator.

8. Apparatus for the treating of slag and other combustion residues in waste burning plants with a combustion oven, a flue gas channel and a flue gas cleaner connected thereto, with the distinction that directly after the slag exit (6) from the combustion plant (1) is arranged a heat-resistant conveyor apparatus (23); this conveyor apparatus (23) leads to a coarse cleaner (7) with a separator (32) for coarse material, and at least one magnetic separator (34); after the coarse cleaner (7) are arranged a device (8), heated by the exhaust gas of the combustion plant, for the preheating of the slag and, after this, a melting oven (10).

9. Apparatus according to claim 8, with the distinction that after the magnetic separator (34) is arranged a breaker (35), and after the breaker (35) a second magnetic separator (37).

10. Apparatus according to claim 8, with the distinction that the device (8) for preheating the slag is connected through a flue gas line (22) with the flue gas channel (3) of the combustion plant (1), and hot waste gases from the flue gas channel (3) flow through it.

11. Apparatus according to claim 8, with the distinction that parallel with the preheating device (8) and before the melting oven (10) is arranged a pyrolysis oven (9); this pyrolysis oven (9) is also heated with hot flue gas from the combustion plant (1), and connected by lines (22) with the exhaust channel (3); between the pyrolysis oven (9) and the melting oven (10) is arranged a conveyor line (24) for the pyrolysis gas produced in the pyrolysis oven (9), and the melting oven (10) has a combustion device (11) for the pyrolysis gases.

12. Apparatus according to claim 8, with the distinction that the melting oven (10) has a waste gas collector (25), and this waste gas collector (25) is connected, through an exhaust line (26), with the flue gas channel (3) or with the entrance side of the flue gas cleaner (4) of the combustion plant (1).

13. Apparatus according to claim 12, with the distinction that a condenser (13) is built into the exhaust line (26).

14. Apparatus according to claim 8, with the distinction that after the melting oven (10) is arranged a cooling device (12) with air or water as coolant for the slag.

15. Apparatus according to claim 11, with the distinction that the exhaust gas lines (26, 38) of the preheating device (8), the pyrolysis oven (9) and the melting oven (10) are connected with the entrance channel of the flue gas cleaner (4) of the waste burning plant (1).

* * * * *

UNITED STATES PATENT AND TRADEMARK OFFICE
CERTIFICATE OF CORRECTION

PATENT NO. : 5,027,722

DATED : July 2, 1991

INVENTOR(S) : Leo Schwyter

It is certified that error appears in the above-identified patent and that said Letters Patent is hereby corrected as shown below:

```
Column 7, Line 46, Claim 4, delete "one of"
     and change "claims" to --claim--.

Column 8, Line 1, Claim 6, delete "one of" and

Line 7, Claim 7, delete the space
          between "100" and "mm".
```

Signed and Sealed this

Seventeenth Day of November, 1992

Attest:

DOUGLAS B. COMER

*Attesting Officer*   *Acting Commissioner of Patents and Trademarks*